United States Patent
Shen

(10) Patent No.: US 10,104,609 B2
(45) Date of Patent: Oct. 16, 2018

(54) SWITCH, SYSTEM FOR POWER MANAGEMENT AND METHOD FOR POWER MANAGEMENT

(71) Applicant: Wistron NeWeb Corp., Hsinchu (TW)

(72) Inventor: Sheng-Kun Shen, Hsinchu (TW)

(73) Assignee: Wistron NeWeb Corp., Hsinchu (TW)

( * ) Notice: Subject to any disclaimer, the term of this patent is extended or adjusted under 35 U.S.C. 154(b) by 202 days.

(21) Appl. No.: 15/054,147

(22) Filed: Feb. 26, 2016

(65) Prior Publication Data
US 2016/0286480 A1    Sep. 29, 2016

(30) Foreign Application Priority Data

Mar. 24, 2015    (TW) .............................. 104109358 A

(51) Int. Cl.
*H04W 52/02*    (2009.01)
*H04W 48/16*    (2009.01)

(52) U.S. Cl.
CPC ........ *H04W 52/0206* (2013.01); *H04W 48/16* (2013.01); *Y02D 70/00* (2018.01); *Y02D 70/142* (2018.01)

(58) Field of Classification Search
None
See application file for complete search history.

(56) References Cited

U.S. PATENT DOCUMENTS

| 2004/0229621 A1* | 11/2004 | Misra | H04W 16/08 455/445 |
| 2010/0002610 A1* | 1/2010 | Bowser | G06F 1/3203 370/311 |
| 2012/0057503 A1* | 3/2012 | Ding | H04W 24/04 370/254 |
| 2013/0102309 A1* | 4/2013 | Chande | H04W 52/244 455/435.1 |
| 2014/0153434 A1* | 6/2014 | Kokovidis | H04W 4/70 370/252 |
| 2015/0063184 A1* | 3/2015 | Toda | H04W 64/00 370/311 |

* cited by examiner

*Primary Examiner* — Chirag G Shah
*Assistant Examiner* — Srinivasa R Reddivalam
(74) *Attorney, Agent, or Firm* — JCIPRNET

(57) ABSTRACT

A switch, a system for power management and a method for power management are provided. Multiple modules are included in the switch. A determination module determines whether a system time of the switch is in a preset time interval. If yes, a switch module switches the switch to a first mode and sends a first switch signal indicating the first mode to multiple access points (APs). A collecting module collects coverage over clients of each of the APs. A searching module searches for at least one first AP among the APs based on the coverage of each of the APs. An adjustment module disables at least one second AP among the APs other than the at least one first AP after a preset time.

17 Claims, 7 Drawing Sheets

SWITCH, SYSTEM FOR POWER MANAGEMENT AND METHOD FOR POWER MANAGEMENT

CROSS-REFERENCE TO RELATED APPLICATION

This application claims the priority benefit of Taiwan application serial no. 104109358, filed on Mar. 24, 2015. The entirety of the above-mentioned patent application is hereby incorporated by reference herein and made a part of this specification.

BACKGROUND OF THE INVENTION

Field of the Invention

The invention relates to a switch, a system for power management, and a method for power management.

Description of Related Art

With the improvement of technology and the changing of times, wireless Internet has already become an indispensable part of people's lives. In order for users to more conveniently use the wireless network, many public places, schools and business organizations all offer wireless access points for use by the users. To satisfy users' demands of using wireless network service anytime and anywhere, the arrangement of wireless access points is becoming increasingly dense.

When wireless access points are being increasingly densely deployed, although users can conveniently access the Internet, at certain times, unnecessary electric power consumption may also result. For example, during off-peak hours (for example, non-working hours), since there are less users requiring to be served, many wireless access points are idle, such that most of the wireless access points are under light load conditions, causing excess electric power consumption. Therefore, how to develop a method for wireless access points to reduce excess power consumption at certain times is one of the topics of interest to those skilled in the art.

SUMMARY OF THE INVENTION

In view of the above, the invention provides a switch, a system for power management and a method for power management. The method decides a transmitting range of an access point according to an average load condition of the access point, a system time of the access point, and an execution mode of the switch. In addition, the method provided by the invention further executes power management of the access point through the switch, such that when the system time is in a preset time interval, electric power consumption of the access point is reduced.

The invention provides a switch, including a storage unit, a plurality of ports, a power control unit, and a processing unit. The storage unit records a plurality of modules. The ports are coupled to a plurality of access points, wherein the plurality of access points serve a plurality of clients. The power control unit provides a power to the plurality of access points through the plurality of ports, respectively. The processing unit is coupled to the storage unit, the plurality of ports and the power control unit, and executes the plurality of modules in the storage unit. The modules include a determination module, a switch module, a collecting module, a searching module, and an adjustment module. The determination module determines whether a system time of the switch is in a preset time interval. When the system time is in the preset time interval, the switch module switches the switch to a first mode and sends a first switch signal indicating the first mode to the plurality of access points. The collecting module collects a coverage over the plurality of clients sent back by each of the plurality of access points in response to the first switch signal. The searching module searches for at least one first access point sufficient for serving the plurality of clients among the plurality of access points based on the coverage of each of the plurality of access points. The adjustment module disables at least one second access point among the plurality of access points other than the at least one first access point after a preset time.

The invention provides a system for power management. The system for power management includes a plurality of access points and a switch. The access points serve a plurality of clients. The switch provides a power to the plurality of access points through a plurality of ports, respectively, and determines whether a first system time is in a preset time interval. When the first system time is in the preset time interval, the switch switches to a first mode and sends a first switch signal indicating the first mode to the plurality of access points. Each of the plurality of access points sends back a coverage over the plurality of clients to the switch in response to the first switch signal. The switch searches for at least one first access point sufficient for serving the plurality of clients among the plurality of access points based on the coverage of the plurality of access points. The switch disables at least one second access point among the plurality of access points other than the at least one first access point after a preset time.

The invention provides a method for power management configured for a system for power management comprising a switch and a plurality of access points. The method includes a plurality of steps as follows: the switch determining whether a first system time is in a preset time interval; when the first system time is in the preset time interval, the switch switching to a first mode and sending a first switch signal indicating the first mode to the plurality of access points; each of the plurality of access points sending back a coverage over the plurality of clients to the switch in response to the first switch signal; the switch searching for at least one first access point sufficient for serving the plurality of clients among the plurality of access points based on the coverage of each of the plurality of access points; and disabling at least one second access point among the plurality of access points other than the at least one first access point after a preset time.

Accordingly, the access points of the invention decide to use the first range or the second range as the transmitting range thereof according to the execution mode of the switch or the system time and the load condition of the access points themselves. In addition, the switch further decides the access points required to be enabled and disables the unrequired access points according to the preset time interval of the system and the transmitting range of the access points.

To make the above and other features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
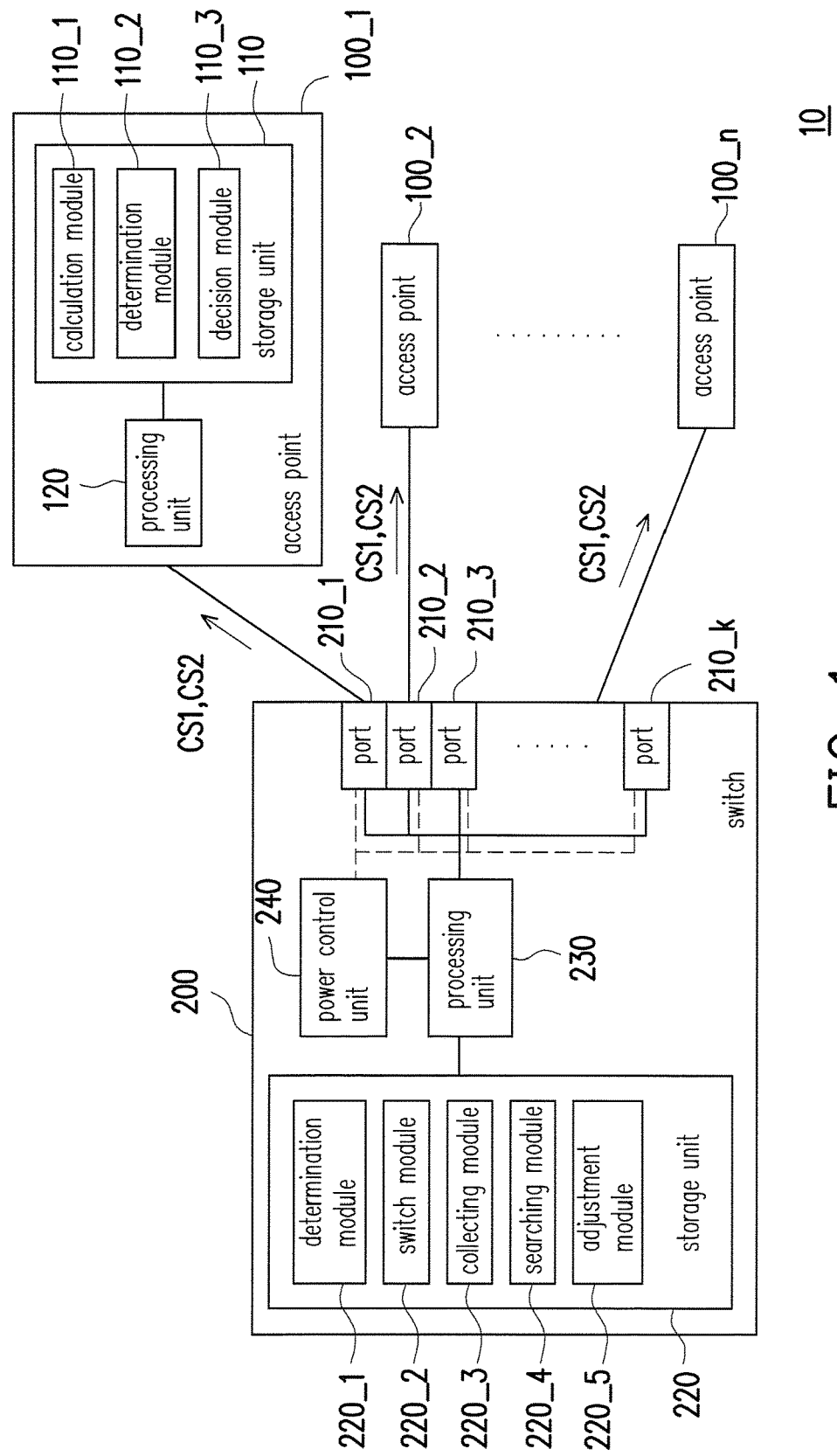
FIG. 1 is a schematic diagram illustrating a system for power management according to an embodiment of the invention.

Regarding the issue that most wireless access point (AP) under light load conditions at certain times causes excess electric power consumption, an access point of the invention adjusts a transmitting range according to a load condition and execution mode of a switch. The invention further uses the switch to execute power management of the access point. Thus, when a system time of the switch is in a preset time interval, electric power consumption of the access point is reduced.

Reference will now be made in detail to the exemplary embodiments of the invention, examples of which are illustrated in the accompanying drawings. Wherever possible, the same reference numbers are used in the drawings and the description to refer to the same or like parts.

FIG. 1 is a schematic diagram illustrating a system for power management according to an embodiment of the invention. In the embodiment, the system for power management 10 includes access points 100_1 to 100_n (n is an integer) and a switch 200. In the embodiment of the invention, the implementation pattern of the access points 100_1 to 100_n are similar, and thus the access point 100_1 is used as an example below to describe characteristics thereof. The access point 100_1 is, for example, a wireless network access point providing a wireless local area network (WLAN), but is not limited thereto.

The access point 100_1 includes a storage unit 110 and a processing unit 120. The storage unit is, for example, a memory, a hard drive, or any other element that can store data, and records a plurality of modules. The processing unit 120 is coupled to the storage unit 110. The processing unit 120 is a general-purpose processing unit, a specific-purpose processing unit, a traditional processing unit, a digital signal processing unit, a plurality of microprocessors, one or a plurality of microprocessor combined with a digital signal processing unit core, a controller, a microcontroller, an application specific integrated circuit (ASIC), a field programmable gate array (FPGA), or any other types of an integrated circuit, a state machine, a processing unit based on an advanced RISC machine (ARM) and the like.

The switch 200 includes a plurality of ports 210_1 to 210_k (k is an integer), a storage unit 220, a processing unit 230, and a power control unit 240. The switch 200 is, for example, an Ethernet switch, but the invention is not limited thereto. The plurality of ports 210_1 to 210_k connect to the access points 100_1 to 100_n, and the access points 100_1 to 100_n serve a plurality of clients, respectively. Each of the plurality of clients is, for example, a smart phone, a tablet computer, a notebook PC, or other similar devices. The various possible implementations of the storage unit 220 and the processing unit 230 are similar to the storage unit 110 and the processing unit 120 of the access point 100_1 and would not be repeated herein.

In the switch 200, the processing unit 230 is coupled to the ports 210_1 to 210_k, the storage unit 220 and the power control unit 240. The power control unit 240 provides a power to access points 100_1 to 100_n through built-in or external power. A built-in power control unit 240 directly connects to a twisted pair through ports 210_1 to 210_k in the Ethernet to provide a power to access points 100_1 to 100_n, respectively. Such power over Ethernet (POE) technology makes the access points 100_1 to 100_n operate in the cable structure of the Ethernet without requiring additional power outlet. An external power control unit 240, for example, provides a power to access points 100_1 to 100_n through general alternative current (AC) or direct current (DC) power, but the invention is not limited thereto.

Figure 2:
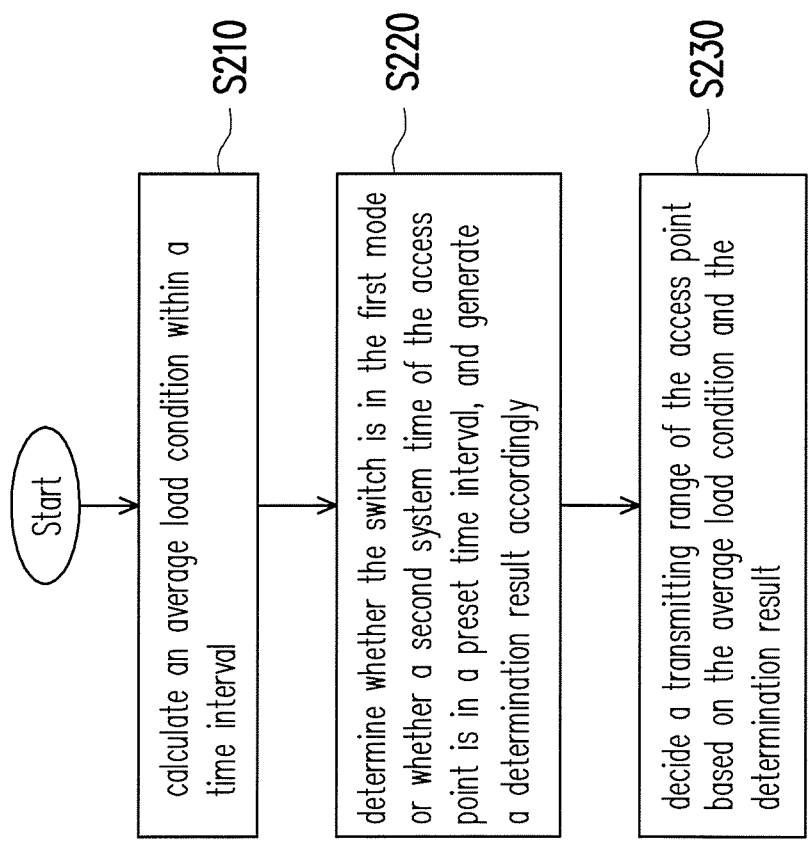
FIG. 2 is a flow diagram illustrating an access point executing a method for power management according to an embodiment of the invention.

FIG. 2 is a flow diagram illustrating an access point executing a method for power management according to an embodiment of the invention. The method provided by the embodiment can be implemented by any the access points 100_1 to 100_n of FIG. 1, but for convenience in describing the concept of the embodiment, the access point 100_1 is used as an example below to describe detailed steps of the method for power management. In the embodiment, the processing unit 120 of the access point 100_1 accesses a calculation module 110_1, a determination module 110_2, and a decision module 110_3 stored by the storage unit 110 to execute each step of the method for power management provided by the invention.

In step S210, the calculation module 110_1 calculates an average load condition within a time interval. In an embodiment, the time interval is preset as a first length of time (for example, 1 hour), and the calculation module 110_1 calculates the average load condition of the access point 100_1 in the first length of time. The average load condition includes an average number of clients connected to the access point 100_1 an average bandwidth, and an average load/utilization rate, etc., but the invention is not limited thereto.

In step S220, the determination module 110_2 determines whether the switch 200 is in the first mode or whether a second system time of the access point 100_1 is in a preset time interval, and generates a determination result accordingly.

In an embodiment, the switch 200 of the invention could at least switch to a first mode and a second mode in response to a first system time thereof, so as to control the power status supplied to the access points 100_1 to 100_n or the execution mode of the access points 100_1 to 100_n. The first mode and the second mode may be, for example, a power-saving mode and a non-power-saving mode, but the invention is not limited thereto. Regarding the first system time, after the switch 200 connects to the Internet, the switch 200 obtains a current time in a time zone thereof through the Internet. In an embodiment, when the first system time of the switch 200 is in a preset time interval (for example, general office non-working hours, or other hours set by the handler of the system for power management 100, but the invention is not limited thereto), the switch 200 switches to the first mode and sends a first switch signal CS1 indicating the first mode to the access points 100_1 to 100_n. On the other hand, when the first system time of the switch 200 is not in the preset time interval, the switch 200 switches to the second mode and sends a second switch signal CS2 indicating the second mode to the access points 100_1 to 100_n.

Furthermore, the access point 100_1 also obtains a current time in a time zone thereof through the Internet as the second system time and determines whether the second system time is in the preset time interval, so as to control a transmitting range of the access point 100_1. Through such corrective action, the access point 100_1 synchronizes the system time of the switch 200 and the access point 100_1. The preset time interval is, for example, office non-working hours, or other hours set by the handler of the system for power management 100, but the invention is not limited thereto. preset time intervalpreset time interval.

In step S230, the decision module 110_3 decides a transmitting range of the access point 100_1 based on the average load condition and the determination result. In an embodiment, the transmitting range is, for example, preset as a first range, and the decision module 110_3 decides whether to expand the transmitting range into a second range or maintain the first range based on the average load condition and the determination result. To describe the details of step S230 in more detail, FIG. 3 is further used as an example below.

Figure 3:
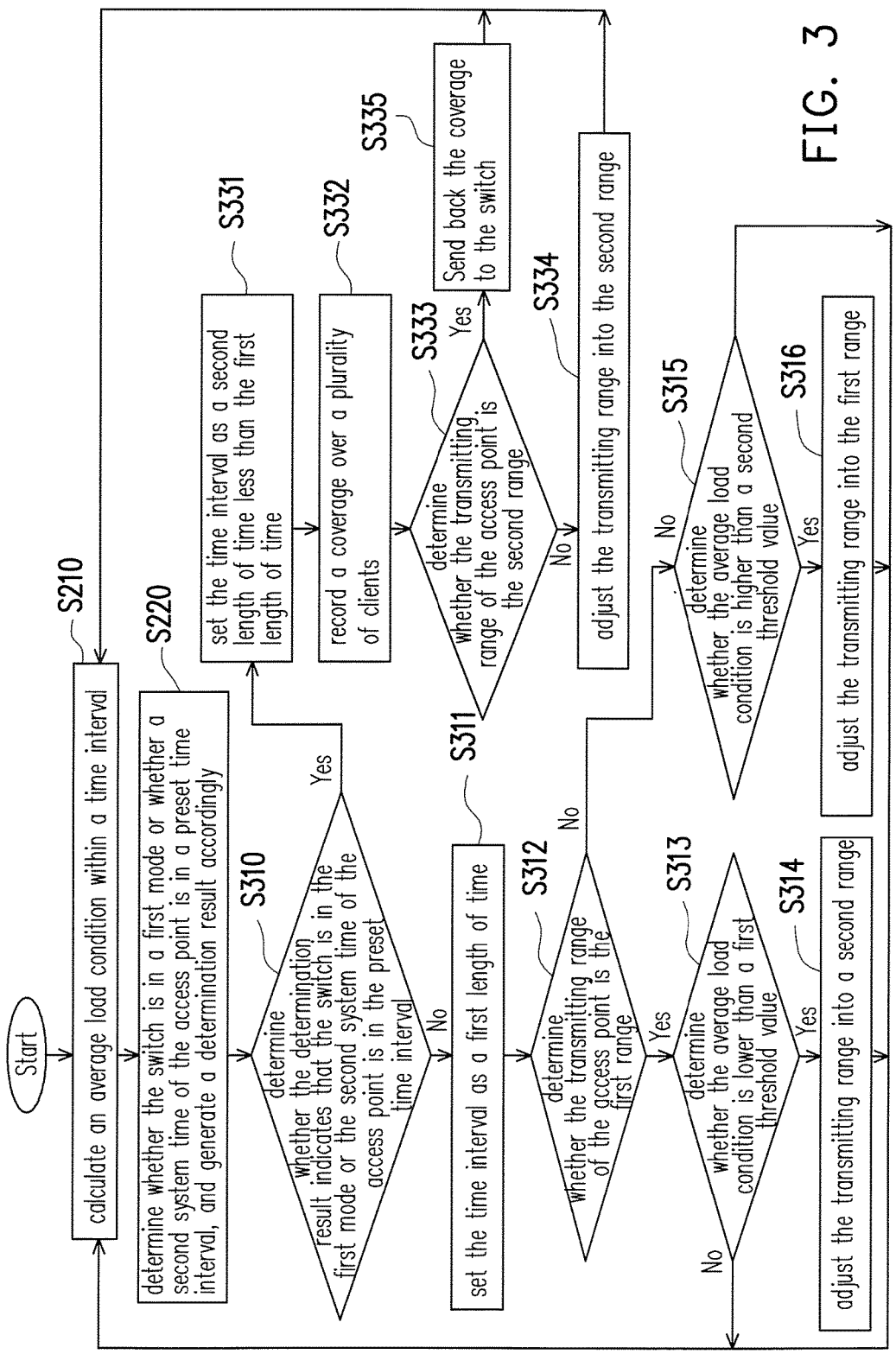
FIG. 3 is a flow diagram illustrating an access point executing a method for power management according to the embodiment of FIG. 2.

FIG. 3 is a flow diagram illustrating an access point executing a method for power management according to the embodiment of FIG. 2. In the embodiment, please refer to relevant descriptions of FIG. 2 for details of steps S210 and S220, which are not repeated here. In addition, step S230 of FIG. 2 is further subdivided into steps S310 to S316 and S331 to S335 of FIG. 3.

After step S220, the decision module 1103 determines in step S310 whether the determination result indicates that the switch 200 is in the first mode or the second system time of the access point 100_1 is in the preset time interval. If the switch 200 is not in the first mode and the second system time of the access point 100_1 is not in the preset time interval either, then the decision module 110_3 proceeds with steps S311 to S316. If the switch 200 is in the first mode and/or the second system time of the access point 100_1 is in the preset time interval, then the decision module 110_3 proceeds with steps S331 to S335.

In step S311, the decision module 110_3 sets the time interval of the access point 100_1 as a first length of time. Then, in step S312, the decision module 110_3 determines whether the transmitting range of the access point 100_1 is the first range. If yes, in step S313, the decision module 110_3 determines whether the average load condition of the access point 100_1 is lower than a first threshold value. If yes, in step S314, the decision module 110_3 adjusts the transmitting range of the access point 100_1 into a second range (which is greater than the first range). Afterwards, the decision module 110_3 returns to step S210, so as to control the calculation module 110_1 to recalculate the average load condition within a time interval (namely, a first length of time).

In an embodiment, the first threshold value is, for example, 50% of system load, but the invention is not limited thereto. Under such circumstance, when the decision module 110_3 determines in step S313 that the average load condition of the access point 100_1 is lower than the first threshold value, it indicates that the number of clients and/or the average load/utilization rate of the access point 100_1 within the current transmitting range of the access point 100_1 is relatively low. Therefore, the decision module 110_3 in step S314 expands the transmitting range of the access point 100_1 into the second range to cover more clients, so as to more fully exploit the computing resources of the access point 100_1.

On the other hand, when the decision module 110_3 determines in step S313 that the average load condition is not lower than the first threshold value, it indicates that the number of clients and/or the average load/utilization rate of the access point 100_1 within the current transmitting range of the access point 100_1 is not exceedingly low. Therefore, the decision module 110_3 directly returns to step S210, so as to control the calculation module 110_1 to recalculate the average load condition within a time interval.

In other embodiments, if the decision module 110_3 determines in step S312 that the transmitting range of the access point 100_1 is not the first range, the decision module 110_3 executes step S315 to determine whether the average load condition of the access point 100_1 is higher than a second threshold value. If yes, in step S316, the decision module 110_3 adjusts the transmitting range of the access point 100_1 into the first range. Afterwards, the decision module 110_3 returns to step S210, so as to control the calculation module 110_1 to recalculate the average load condition of the access point 100_1.

In an embodiment, the second threshold value is, for example, 90% of system load, but the invention is not limited thereto. Under such condition, when the decision module 110_3 determines in step S315 that the average load condition of the access point 100_1 is higher than the second threshold value, it indicates that the number of clients and/or the average load/utilization rate of the processing unit 120 within the current transmitting range of the access point 100_1 is approaching full capacity. Therefore, the decision module 110_3 in step S316 reduce the transmitting range of the access point 100_1 into the first range to cover less clients, so as to lighten the burden of the access point 100_1.

On the other hand, when the decision module 110_3 determines in step S315 that the average load condition is not higher than the second threshold value, it indicates that the number of clients and/or the average load/utilization rate of the processing unit 120 within the current transmitting range of the access point 100_1 is not exceedingly high. Therefore, the decision module 110_3 directly returns to step S210, so as to control the calculation module 110_1 to recalculate the average load condition within a time interval.

In other embodiments, if the decision module 110_3 determines that the switch 200 is in the first mode and/or the second system time of the access point 100_1 is in the preset time interval, the decision module 110_3 executes step S311 to set the time interval as a second length of time (for example, 0.5 hour) less than the first length of time. In other words, when the switch 200 is in the first mode and/or the second system time of the access point 100_1 is in the preset time interval (for example, non-working hours), the decision module 110_3 shortens an observation time for calculating the average load condition, so as to more instantaneously adjust the transmitting range according to the average load condition.

Next, in step S332, the decision module 110_3 records a coverage over a plurality of clients of the access point 100_1. For example, the decision module 110_3 records all of the clients covered by current transmitting range. Afterwards, in step S333, the decision module 110_3 determines whether the transmitting range of the access point 100_1 is the second range.

When the decision module 110_3 determines that the transmitting range of the access point 100_1 is not the second range, in step S334, the decision module 110_3 adjusts the transmitting range of the access point 100_1 into the second range. That is, when the switch 200 is in the first mode and/or the second system time of the access point 100_1 is in the preset time interval, since there are less clients required to be served then, and distribution is more sparse, the decision module 110_3 adjusts the transmitting range into the larger second range to cover more clients. Afterwards, the decision module 110_3 returns to step S210, so as to control the calculation module 110_1 to recalculate the average load condition within a time interval (namely, a second length of time).

However, if the decision module 110_3 determines in step S333 that the transmitting range of the access point 100_1 is the second range, then the decision module 110_3 executes step S335 to send back the coverage of the access point 100_1 to the switch 200. Afterwards, the decision module 110_3 returns to step S210, so as to control the calculation module 110_1 to recalculate the average load condition within a time interval (namely, a second length of time).

In brief, when the switch 200 is not in the first mode and the second system time of the access point 100_1 is not in the preset time interval, the access point 100_1 of the embodiment of the invention observes the average load condition within the time interval and accordingly decides to use the first range or the second range as the transmitting range thereof. When the switch 200 is in the first mode and/or the second system time of the access point 100_1 is in the preset time interval, the access point 100_1 uses the second range as the transmitting range thereof to cover more clients. In other words, the access point 100_1 of the invention is capable of adaptively reducing or expanding the transmitting range according to the execution mode of the switch 200 or the system time of the access point 100_1 itself and the average load condition to provide service to the clients.

Figure 4:
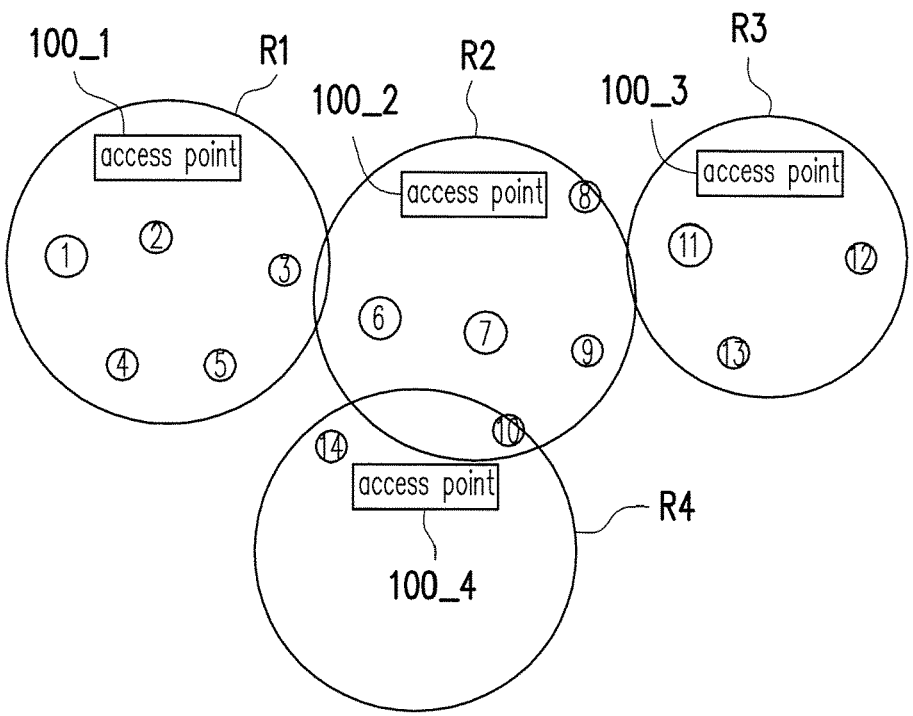
FIG. 4 is a schematic diagram illustrating a plurality of access points individually using a first range as a transmitting range to serve a plurality of clients respectively according to an embodiment of the invention.

FIG. 4 is a schematic diagram illustrating a plurality of access points individually using a first range as a transmitting range to serve a plurality of clients respectively according to an embodiment of the invention. In the embodiment, suppose n is 4, the switch 200 is not in the first mode and the second system time of each of the access points 100_1 to 100_4 is not in the preset time interval (namely, working hours), and the average load condition of each of the access points 100_1 to 100_4 is higher than the first threshold value. Thus, each of the access points 100_1 to 100_4 uses the first ranges R1 to R4 as the transmitting range thereof to cover the clients 1 to 14.

Figure 5:
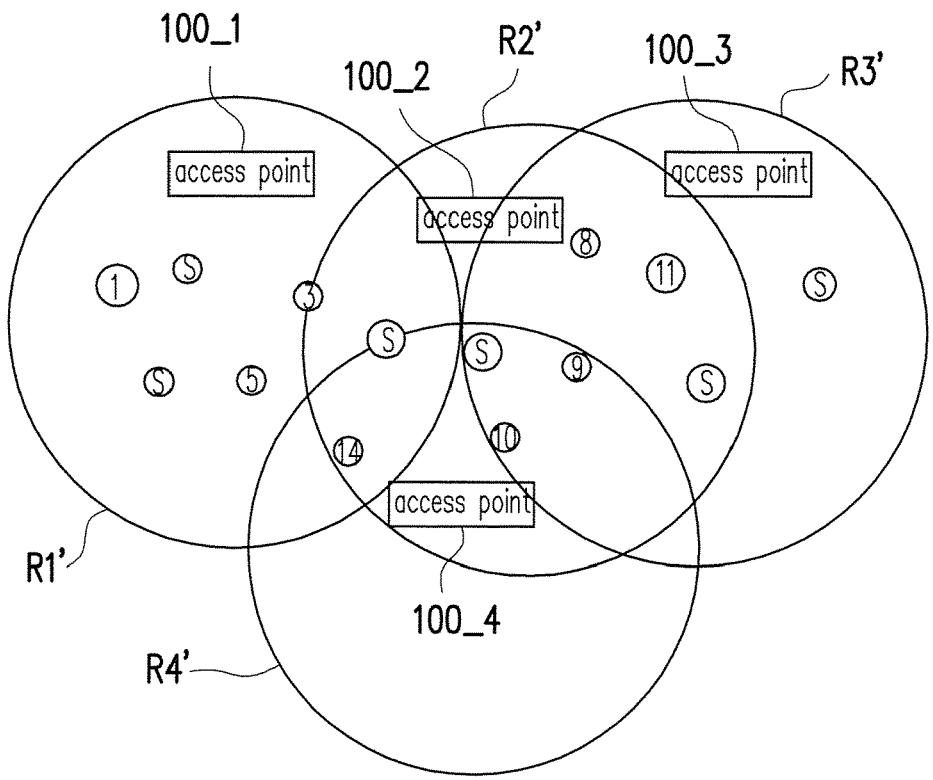
FIG. 5 is a schematic diagram illustrating a plurality of access points individually using a second range as a transmitting range to serve a plurality of clients respectively according to an embodiment of the invention.

Please refer to FIG. 5. FIG. 5 is a schematic diagram illustrating a plurality of access points individually using a second range as a transmitting range to serve a plurality of clients respectively according to an embodiment of the invention. In the embodiment, suppose this time, the switch 200 is in the first mode and/or the second system time of each of the access points 100_1 to 100_4 is in the preset time interval, and the clients 2, 4, 6, 7, 12 and 13 (namely, clients labeled as S) are turned off or represent an offline status. At this time, since only clients 1, 3, 5, 8-11 and 14 require service, each of the access points 100_1 to 100_4 uses the second ranges R1' to R4' as the transmitting range thereof to cover a smaller number of more sparsely distributed clients 1, 3, 5, 8-11 and 14.

In an embodiment, in the case that the access points 100_1 to 100_4 expand the transmitting range, the circumstance that only a portion of the access points 100_1 to 100_4 is required to cover the clients 1, 3, 5, 8-11 and 14 can occur. At this time, the switch 200 provided by the invention searches for a first access point sufficient for covering the clients 1, 3, 5, 8-11 and 14 among the access points 100_1 to 100_4, and then disables some of unrequired second access points among the access points 100_1 to 100_4 through a method introduced below. Thus, the switch 200 more fully exploits the resources of the first access point, while simultaneously saving electric power consumption of the second access point.

Figure 6:
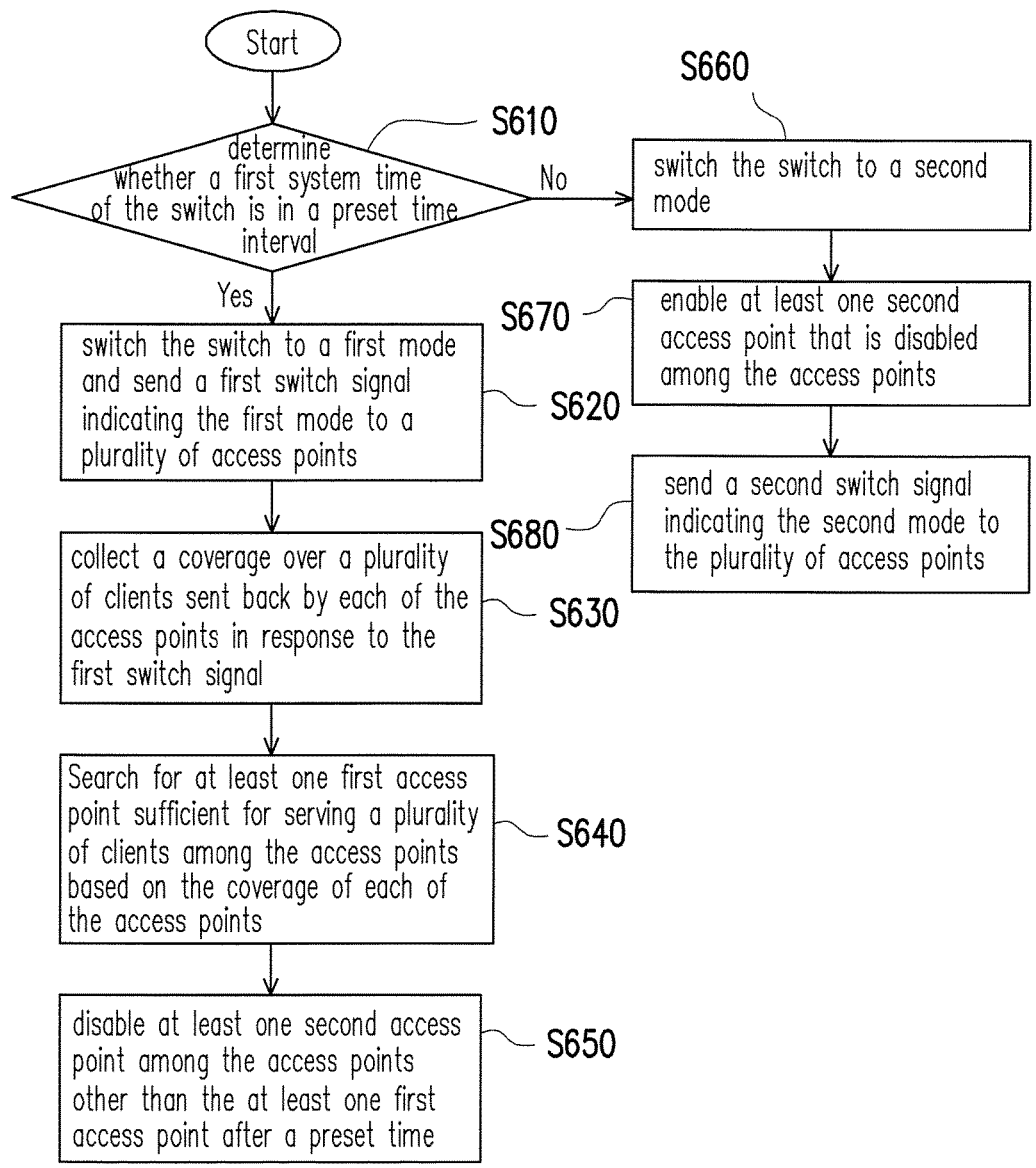
FIG. 6 is a flow diagram illustrating a switch executing a method for power management according to an embodiment of the invention.

FIG. 6 is a flow diagram illustrating a switch executing a method for power management according to an embodiment of the invention. In the embodiment, the processing unit 230 of the switch 200 accesses a determination module 220_1, a switch module 220_2, a collecting module 220_3, a searching module 220_4, and an adjustment module 220_5 stored by the storage unit 220 to execute each step of the method for power management provided by the embodiment.

In step S610, the determination module 220_1 determines whether the first system time of the switch 200 is in the preset time interval. In the embodiment, the preset time interval is, for example, general office non-working hours, or other hours set by the handler of the system for power management, but the invention is not limited thereto.

In step S620, when the first system time is in the preset time interval, the switch module 220_2 switches the switch 200 to a first mode and sends a first switch signal CS1 indicating the first mode to the access points 100_1 to 100_n.

In step S630, the collecting module 220_3 collects a coverage over a plurality of clients sent back by each of the access points 100_1 to 100_n in response to the first switch signal CS1. In step S640, the searching module 220_4 searches for at least one first access point sufficient for serving a plurality of clients among the access points 100_1 to 100_n based on the coverage of each of the access points 100_1 to 100_n. In step S650, the adjustment module 220_5 disables at least one second access point among the access points other than the at least one first access point after a preset time.

Figure 7:
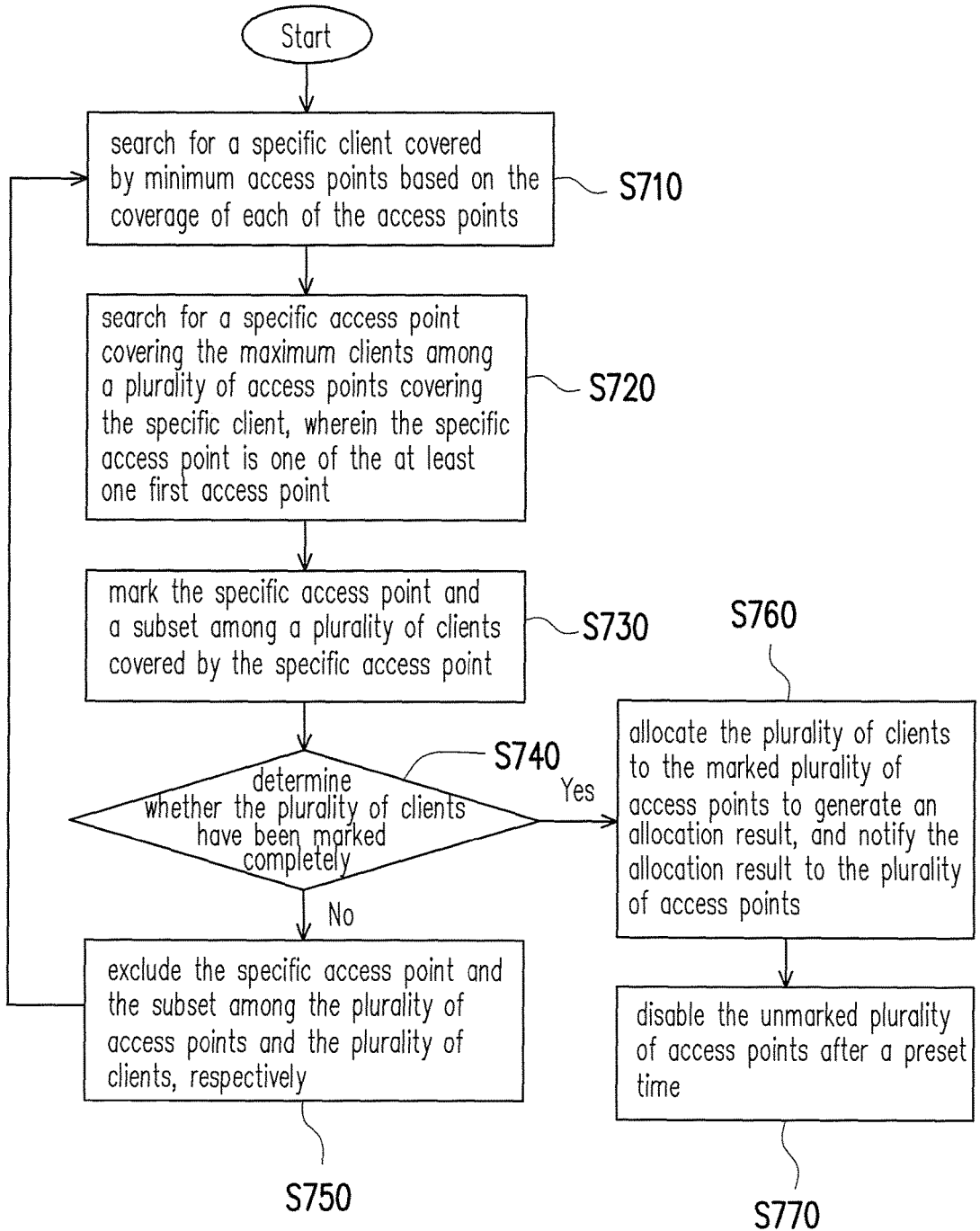
FIG. 7 is a schematic diagram illustrating an execution flow of a searching module and an adjustment module according to an embodiment of the invention.

To describe the details of steps S640 to S650 in more detail, the invention further divides steps S640 to S650 in more details into steps S710 to S770 of FIG. 7, while explaining together with the pattern in FIG. 5 at the same time. FIG. 7 is an execution flow diagram illustrating a searching module and an adjustment module according to an embodiment of the invention. Please refer to FIGS. 5 and 7. In step S710, the searching module 220_4 searches for a specific client covered by minimum access points based on the coverage of each of the access points 100_1 to 100_4.

In the embodiment, the coverage of the clients 1, 3, 5, 8-11 and 14 by the access points 100_1 to 100_4 can be represented in the form of Table 1 below. For example, since the client 1 only falls within the range covered by the access point 100_1, the columns corresponding to the client 1 are marked by the symbol "V" only at the access point 100_1. As another example, since the client 3 falls within the range covered by the access points 100_1 and 100_2, the columns corresponding to the client 3 are marked by the symbol "V" at the access points 100_1 and 100_2. The meaning of the remaining fields in Table 1 can be inferred based on the teachings herein and is not repeated.

TABLE 1

|  | Access point 100_1 | Access point 100_2 | Access point 100_3 | Access point 100_4 |
|---|---|---|---|---|
| Client 1 | V |  |  |  |
| Client 3 | V | V |  |  |
| Client 5 | V |  |  |  |
| Client 8 |  | V | V |  |
| Client 9 |  | V | V | V |
| Client 10 |  | V | V | V |
| Client 11 |  | V | V |  |
| Client 14 | V | V |  | V |

According to Table 1, the clients 1 and 5 are only covered by one access point (namely, the access point 100_1). Thus, the searching module 220_4 defines the clients 1 and 5 as the specific clients covered by minimum access points.

Then, in step S720, the searching module 220_4 searches for a specific access point covering the maximum clients among the plurality of access points covering the specific client, wherein the specific access point is one of the at least one first access point. Please continue referring to Table 1, since the specific clients 1 and 5 are only covered by the access point 100_1, the searching module 220_4 sets the access point 100_1 as the specific access point.

In step S730, the searching module 220_4 marks the specific access point and a subset among the plurality of clients covered by the specific access point. Please refer to Table 2. In Table 2, square brackets (namely, "[ ]") are used to mark the specific access point (namely, the access point 100_1) and the subset among the plurality of clients covered by the same (namely, the clients 1, 3, 5 and 14).

TABLE 2

|  | [Access point 100_1] | Access point 100_2 | Access point 100_3 | Access point 100_4 |
|---|---|---|---|---|
| [Client 1] | V |  |  |  |
| [Client 3] | V | V |  |  |
| [Client 5] | V |  |  |  |
| Client 8 |  | V | V |  |
| Client 9 |  | V | V | V |
| Client 10 |  | V | V | V |
| Client 11 |  | V | V |  |
| [Client 14] | V | V |  | V |

In step S740, the searching module 220_4 determines whether the plurality of clients have been marked completely. Please refer to Table 2. Since the clients 8-11 are unmarked, the searching module 220_4 proceeds with step S750 to exclude the specific access point and the subset among the plurality of access points and the plurality of clients, respectively, and executes step S710 again. That is, in the case that the access point 100_1 and the clients 1, 3, 5 and 14 are excluded, the searching module 220_4 can execute step S710 again.

Please refer to Table 2 again, in the case that the coverage range of the specific access point and the subset is excluded, since the clients 8 and 11 are only covered by the access points 100_2 and 100_3, the searching module 220_4 defines the clients 8 and 11 as the specific clients covered by minimum access points (step S710). Then, in step S720, the searching module 220_4 chooses the access point 100_2 covering the maximum clients as the specific access point among the access points 100_2 and 100_3. Then, in step S730, the searching module 220_4 marks the access point 100_2 and the subset among the clients 8-11 covered by the same (namely, the clients 8-11), as shown in Table 3.

TABLE 3

|  | [Access point 100_1] | [Access point 100_2] | Access point 100_3 | Access point 100_4 |
|---|---|---|---|---|
| [Client 1] | V |  |  |  |
| [Client 3] | V | V |  |  |
| [Client 5] | V |  |  |  |
| [Client 8] |  | V | V |  |
| [Client 9] |  | V | V | V |
| [Client 10] |  | V | V | V |
| [Client 11] |  | V | V |  |
| [Client 14] | V | V |  | V |

Then, in step S740, since the searching module 220_4 determines that the clients 1, 3, 5, 8-11 and 14 have been marked completely, the adjustment module 220_5 proceeds to allocate in step S760 the plurality of clients (namely, the clients 1, 3, 5, 8-11 and 14) to the marked plurality of access points (namely, the access points 100_1 and 100_2) to generate an allocation result, and notify the allocation result to the plurality of access points (namely, the access points 100_1 to 100_4). In other words, the searching module 220_4 has searched for the access points 100_1 and 100_2 (namely, the aforementioned first access point) sufficient for covering the clients 1, 3, 5, 8-11 and 14 among the access points 100_1 to 100_4. In the embodiment, since the access points 100_3 and 100_4 are unmarked, it indicates that even if the access points 100_3 and 100_4 are disabled, the clients 1, 3, 5, 8-11 and 14 are still covered by other access points. In other words, the unmarked access points 100_3 and 100_4 in the embodiment are the second access point unrequired to be turned on/enabled.

Therefore, in step S770, the adjustment module 220_5 disables the unmarked plurality of access points (namely, the access points 100_3 and 100_4) after a preset time. The preset time is, for example, 10 minutes or other lengths of time set by the handler of the system for power management 100. In an embodiment, the manner that the adjustment module 220_5 disables the access points 100_3 and 100_4 is, for example, stopping the supply of power to the access points 100_3 and 100_4 through the ports 210_3 and 210_4, but the invention is not limited thereto. Thus, the switch 200 more fully exploits the resources of the access points 100_1 and 100_2, while simultaneously saving electric power consumption of the access points 100_3 and 100_4.

In addition, according to the allocation result, the access points 100_3 and 100_4 also notify the clients originally being served to connect to one of the access points 100_1 and 100_2 instead. In an embodiment, the access points 100_3 and 100_4 notify the clients being served that service stops after the preset time.

Figure 8:
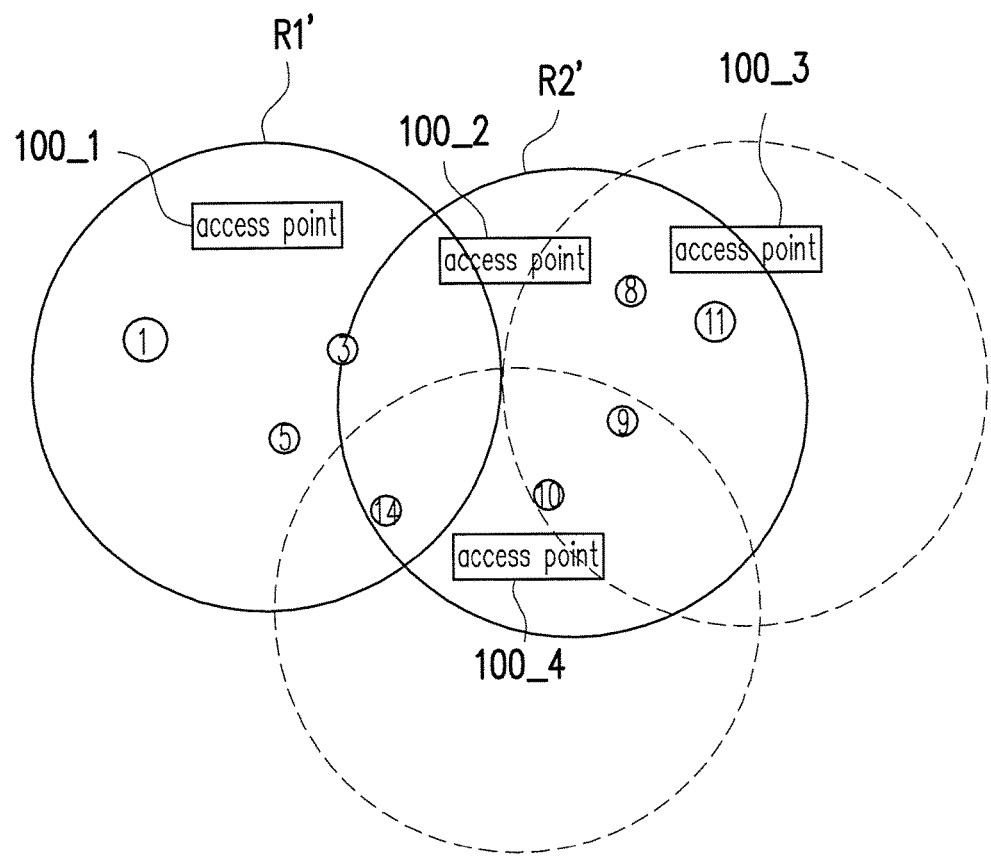
FIG. 8 is a schematic diagram illustrating a portion of access points serving a plurality of clients respectively according to an embodiment of the invention.

Please refer to FIG. 8. FIG. 8 is a flow diagram illustrating a portion of access points (namely, the access points 100_1 and 100_2) serving a plurality of clients (namely, the clients 1, 3, 5, 8-11 and 14) respectively according to an embodiment of the invention. Through the above steps, the switch 200 ensures that when the system time is in the preset time interval, the minimum quantity of access points serve all of the clients 1, 3, 5, 8-11 and 14.

Please refer to step S610 in FIG. 6 again. When the determination module 220_1 determines in step S610 that the first system time of the switch 200 is not in the preset time interval (namely, not non-working hours), the switch 200 executes steps S660 to S680. In step S660, the switch module 220_2 switches the switch 200 to a second mode (namely, a non-power-saving mode). In step S670, the switch module 220_2 enables at least one second access point that is disabled among the access points 100_1 to 100_$n$. Afterwards, in step S680, the switch module 220_2 sends a second switch signal CS2 indicating the second mode to the access points 100_1 to 100_$n$.

In other words, when the first system time is not in the preset time interval, the switch 200 enables all of the access points 100_1 to 100_$n$, such that the access points 100_1 to 100_$n$ serve a large number of clients.

In brief, the switch 200 of the embodiment of the invention decides to enable/disable the access points 100_1 to 100_$n$ according to the first system time and the transmitting range of the access points 100_1 to 100_$n$. Thus, the invention ensures that the minimum quantity of access points 100_1 to 100_$n$ serve all of the clients when the first system time is in the preset time interval. Hence, the purpose of saving power could be achieved.

In summary of the above, the access points of the invention decide to use the first range or the second range as the transmitting range thereof according to the execution mode of the switch or the system time and the load condition of the access points themselves, so as to use the more appropriate transmitting range to provide service to the clients. In addition, the switch further decides the access points required to be enabled and disables the unrequired access points according to the preset time interval and the transmitting range of the access points. Accordingly, the switch of the invention ensures that when the first system time is in the preset time interval, the resources of the enabled access points are more fully exploited, while simultaneously saving electric power consumption of the disabled access points.

Although the invention has been described with reference to the above embodiments, it will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A switch, comprising:
a storage device, recording a plurality of modules;
a plurality of ports, coupled to a plurality of access points, wherein the plurality of access points serve a plurality of clients;
a power control device, providing a power to the plurality of access points through the plurality of ports, respectively; and
a processor, coupled to the storage device, the plurality of ports and the power control device, executing the plurality of modules in the storage device to perform the following steps:
determining whether a first system time of the switch is in a preset time interval;
when the first system time is in the preset time interval, switching the switch to a first mode and sending a first switch signal to the plurality of access points;
collecting a coverage over the plurality of clients sent back by each of the plurality of access points in response to the first switch signal, wherein the coverage is a record which indicates the clients being covered by which of the access points with current transmitting ranges;
searching for at least one first access point sufficient for serving the plurality of clients among the plurality of access points based on the coverage of each of the plurality of access points, wherein the processor is configured to:
search for a specific client covered by minimum access points based on the coverage of each of the plurality of access points;
search for a specific access point covering maximum clients among the plurality of access points covering the specific client, wherein the specific access point is one of the at least one first access point;
mark the specific access point and a subset among the plurality of clients covered by the specific access point; and
determine whether the plurality of clients have been marked completely;
if no, exclude the specific access point and the subset among the plurality of access points and the plurality of clients, respectively, and search again for the specific client covered by minimum access points based on the coverage of each of the plurality of access points;
if yes, then the processor is configured to:
allocate the plurality of clients to the marked plurality of access points to generate an allocation result, and notify the allocation result to the plurality of access points; and
disable the unmarked plurality of access points after the preset time, wherein the unmarked plurality of access points are the at least one second access point; and
disabling at least one second access point among the plurality of access points other than the at least one first access point after a preset time.

2. The switch according to claim 1, wherein when the first system time is not in the preset time interval, the processor is further configured to:
switch the switch to a second mode;
enable the at least one second access point that is disabled among the plurality of access points; and
send a second switch signal indicating the second mode to the plurality of access points.

3. A system for power management, comprising:
a plurality or access points, serving a plurality or clients; and
a switch, providing a power to the plurality of access points through a plurality of ports, respectively, determining whether a first system time is in a preset time interval,
when the first system time is in the preset time interval, the switch switches to a first mode and sending a first switch signal to the plurality of access points;
each of the plurality of access points sends back a coverage over the plurality of clients to the switch in response to the first switch signal, wherein the coverage is a record which indicates the clients being covered by which of the access points with current transmitting ranges;
the switch searches for at least one first access point sufficient for serving the plurality of clients among the plurality of access points based on the coverage of each of the plurality of access points, wherein the switch is further configured to:
search for a specific client covered by minimum access points based on the coverage of each of the plurality of access points;
search for a specific access point covering maximum clients among the plurality of access points covering the specific client, wherein the specific access point is one of the at least one first access point;

mark the specific access point and a subset among the plurality of clients covered by the specific access point; and determine whether the plurality of clients have been marked completely;

if no, exclude the specific access point and the subset among the plurality of access points and the plurality of clients, respectively, and search again for the specific client covered by minimum access points based on the coverage of each of the plurality of access points;

if yes, then the switch is configured to:

allocate the plurality of clients to the marked plurality of access points to generate an allocation result, and notify the allocation result to the plurality of access points; and disable the unmarked plurality of access points after the preset time, wherein the unmarked plurality of access points are the at least one second access point; and the switch disables at least one second access point among the plurality of access points other than the at least one first access point after a preset time.

4. The system according to claim 3, wherein when the first system time is not in the preset time interval, the switch is further configured to:

switch to a second mode;

enable the at least one second access point that is disabled among the plurality of access points; and send a second switch signal indicating the second mode to the plurality of access points.

5. The system according to claim 3, wherein each of the plurality of access points comprises:

a storage device, recording a plurality of modules; and a processor, coupled to the storage device, accessing and executing the plurality of modules in the storage device to perform the following steps:

calculating an average load condition within a time interval;

determining whether the switch is in the first mode or whether a second system time of the access point is in the preset time interval, and generating a determination result accordingly; and deciding a transmitting range of the access point based on the average load condition and the determination result.

6. The system according to claim 5, wherein the time interval is preset as a first length of time, and the transmitting range is preset as a first range.

7. The system according to claim 6, wherein when the determination result indicates that the switch is not in the first mode and the second system time of the access point is not in the preset time interval, the processor is configured to:

set the time interval as the first length of time;

determine whether the transmitting range of the access point is the first range;

if yes, determine whether the average load condition is lower than a first threshold value;

if no, recalculate the average load condition;

if yes, adjust the transmitting range into a second range, and recalculate the average load condition, wherein the second range is greater than the first range.

8. The system according to claim 7, wherein when the processor determines that the transmitting range of the access point is not the first range, the processor is configured to:

determine whether the average load condition is higher than a second threshold value;

if no, recalculate the average load condition;

if yes, adjust the transmitting range into the first range, and recalculate the average load condition.

9. The system according to claim 5, wherein when the determination result indicates that the switch is in the first mode or the second system time of the access point is in the preset time interval, the processor is configured to:

set the time interval as a second length of time less than the first length of time;

record a coverage over the plurality of clients; and determine whether the transmitting range is the second range;

if no, adjust the transmitting range into the second range, and recalculate the average load condition;

if yes, send back the coverage to the switch, and recalculate the average load condition.

10. The system according to claim 3, wherein each of the at least one second access point notifies the plurality of clients being served to connect to one of the at least one first access point instead, according to the allocation result, wherein each of the at least one second access point further notifies the plurality of clients being served that service stops after the preset time.

11. A method for power management, configured for a system for power management comprising a switch and a plurality of access points, comprising:

the switch determining whether a first system time is in a preset time interval;

when the first system time is in the preset time interval, the switch switching to a first mode and sending a first switch signal to the plurality of access points;

each of the plurality of access points sending back a coverage over the plurality of clients to the switch in response to the first switch signal, wherein the coverage is a record which indicates the clients being covered by which of the access points with current transmitting ranges;

the switch searching for at least one first access point sufficient for serving the plurality of clients among the plurality of access points based on the coverage of each of the plurality of access points, comprising:

the switch searching for a specific client covered by minimum access points based on the coverage of each of the plurality of access points;

the switch searching for a specific access point covering maximum clients among the plurality of access points covering the specific client, wherein the specific access point is one of the at least one first access point;

the switch marking the specific access point and a subset among the plurality of clients covered by the specific access point; and the switch determining whether the plurality of clients have been marked completely;

if no, the switch excluding the specific access point and the subset among the plurality of access points and the plurality of clients, respectively, and searching again for the specific client covered by minimum access points based on the coverage of each of the plurality of access points;

if yes, the step of the switch adjusting a portion of the plurality of clients served by at least one second access point of the plurality of access points to be served by at least one first access point, and disabling the at least one second access point after a preset time comprises:

the switch allocating the plurality of clients to the marked plurality of access points to generate an allocation result, and notifying the allocation result to the plurality of access points; and the switch disabling the unmarked plurality of access points after the preset time, wherein the unmarked plurality of access points are the at least one second access point; and disabling at least one second access point among the plurality of access points other than the at least one first access point after a preset time.

12. The method according to claim 11, wherein when the first system time is not in the preset time interval, further comprising:

the switch switching to a second mode;

the switch enabling the at least one second access point that is disabled among the plurality of access points; and the switch sending a second switch signal indicating the second mode to the plurality of access points.

13. The method according to claim 11, wherein each of the plurality of access points further comprises:

calculating an average load condition within a time interval;

determining whether the switch is in the first mode or whether a second system time of the access point is in the preset time interval, and generating a determination result accordingly; and deciding a transmitting range of the access point based on the average load condition and the determination result.

14. The method according to claim 13, wherein the time interval is preset as a first length of time, and the transmitting range is preset as a first range.

15. The method according to claim 14, wherein when the determination result indicates that the switch is not in the first mode and the second system time of the access point is not in the preset time interval, the step of deciding the transmitting range of the access point based on the average load condition and the determination result comprises:

setting the time interval as the first length of time;

determining whether the transmitting range of the access point is the first range;

if yes, determining whether the average load condition is lower than a first threshold value;

if no, recalculating the average load condition;

if yes, adjusting the transmitting range into a second range, and recalculating the average load condition, wherein the second range is greater than the first range.

16. The method according to claim 15, wherein when determining that the transmitting range of the access point is not the first range, the step of deciding the transmitting range of the access point based on the average load condition and the determination result comprises:

determining whether the average load condition is higher than a second threshold value;

if no, recalculating the average load condition;

if yes, adjusting the transmitting range into the first range, and recalculating the average load condition.

17. The method according to claim 13, wherein when the determination result indicates that the switch is in the first mode or the second system time of the access point is in the preset time interval, the step of deciding the transmitting range of the access point based on the average load condition and the determination result comprises:

setting the time interval as a second length of time less than the first length of time;

recording a coverage over the plurality of clients; and determining whether the transmitting range is the second range;

if no, adjusting the transmitting range into the second range, and recalculating the average load condition;

if yes, sending back the coverage to the switch, and recalculating the average load condition.

\* \* \* \* \*